(12) United States Patent
Grebing et al.

(10) Patent No.: US 8,416,819 B2
(45) Date of Patent: Apr. 9, 2013

(54) METHOD AND DEVICE FOR GENERATING A SELF-REFERENCED OPTICAL FREQUENCY COMB

(75) Inventors: Christian Grebing, Berlin (DE); Sebastian Koke, Berlin (DE); Günter Steinmeyer, Berlin (DE)

(73) Assignee: Femtolasers Produktions GmbH (AT)

( * ) Notice: Subject to any disclaimer, the term of this patent is extended or adjusted under 35 U.S.C. 154(b) by 0 days.

(21) Appl. No.: 13/132,111

(22) PCT Filed: Dec. 2, 2009

(86) PCT No.: PCT/AT2009/000469
§ 371 (c)(1),
(2), (4) Date: Jun. 1, 2011

(87) PCT Pub. No.: WO2010/063051
PCT Pub. Date: Jun. 10, 2010

(65) Prior Publication Data
US 2011/0235661 A1  Sep. 29, 2011

(30) Foreign Application Priority Data
Dec. 2, 2008  (DE) .......................... 10 2008 059 902

(51) Int. Cl.
*H01S 3/10*  (2006.01)

(52) U.S. Cl.
USPC ............ 372/23; 372/28; 372/29.016; 372/30; 372/32

(58) Field of Classification Search ............ 372/23, 372/28, 29.016, 30
See application file for complete search history.

(56) References Cited

U.S. PATENT DOCUMENTS
7,123,402 B1 * 10/2006 Doerr et al. .................. 359/326
2004/0017833 A1  1/2004 Cundiff et al.
(Continued)

FOREIGN PATENT DOCUMENTS
DE  19911103 A1  9/2000

OTHER PUBLICATIONS

English translation of Notification of Transmittal of Translation of the International Preliminary Report on Patentability with a mailing date of Jun. 16, 2011, International Preliminary Report on Patentability, Written Opion of the International Searching Authority issued in corresponding International Application No. PCT/AT2009/000469 (17 pages).

(Continued)

*Primary Examiner* — Dung Nguyen
(74) *Attorney, Agent, or Firm* — Ostrolenk Faber LLP

(57) ABSTRACT

The present disclosure relates to a method and to a device (1) by which a train (2, 2) of short laser pulses of a mode-coupled laser (3) is compensated with respect to the carrier envelope offset frequency of the individual lines contained in the associated frequency comb. The aim of the disclosure is to determine the carrier envelope offset frequency and to utilize said frequency to operate an acousto-optical frequency shifter (13). In said shifter, the uncompensated train of temporally equidistantly short laser pulses is diffracted in a first order such that the individual lines of the frequency comb are shifted by the carrier envelope offset frequency. The resulting compensated train of short laser pulses has a frequency comb, the individual lines of which are integral multiples of the repetition frequency of the individual light pulses in the train of short laser pulses.

25 Claims, 3 Drawing Sheets

U.S. PATENT DOCUMENTS

Figure 1:
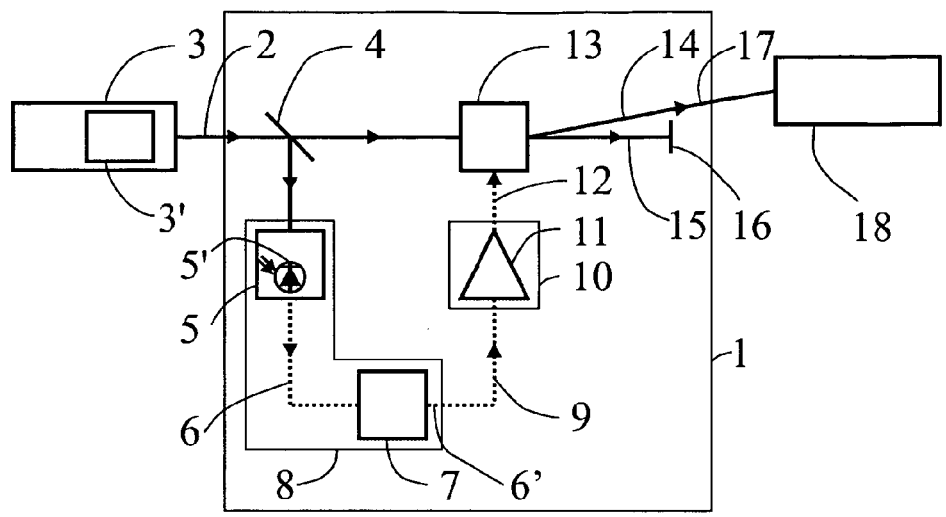

| | | |
|---|---|---|
| 2004/0179561 A1 | 9/2004 | Muenter |
| 2007/0086713 A1* | 4/2007 | Ingmar et al. ............... 385/122 |
| 2007/0217542 A1* | 9/2007 | Kaertner et al. ............ 375/295 |

OTHER PUBLICATIONS

International Search Report dated Apr. 21, 2010, issued in corresponding international application No. PCT/AT2009/000469.

Telle H R et al: "Carrier-envelope offset phase control: a novel concept for absolute optical frequency measurement and ultrashort pulse generation" Applied Physics B: Lasers and Optics, Springer International, Berlin, DE LNKDDOI:I0.I007/S003400050813, vol. B69, No. 4, Oct. 1, 1999, pp. 327-332, XP002198106 ISSN: 0946-2171 cited in the application p. 327-p. 328.

Grebing C et al: "Self-referencing of optical frequency combs" Jun. 2, 2009, Lasers and Electro-Optics, 2009 and 2009 Conference on Quantum Electronics and Laser Science Conference. CLEO/QELS 2009. Conference on, IEEE Piscataway, NJ, USA, pp. 1-2 , XP031520531 ISBN: 9781557528698 the whole document.

Xu, L. et al., "Route to phase control of ultrashort light pulses" Opt. Lett. 21, 2008 et seq. 1996.

Jones, et al., *Physical Review Letters*, The American Physical Society, vol. 86, No. 15, Apr. 9, 2001; pp. 3288-3291.

Jones, et al., *Technical Digest*, Summary of Papers Presented at the Conference on Lasers and Electro-Optics 1 (2002): 603-604.

\* cited by examiner

METHOD AND DEVICE FOR GENERATING A SELF-REFERENCED OPTICAL FREQUENCY COMB

CROSS REFERENCE TO RELATED APPLICATIONS

The present application is a 35 U.S.C. §371 National Phase conversion of PCT/AT2009/000469, filed Dec. 2, 2009, which claims benefit of German Application No. 10 2008 059 902.6, filed Dec. 2, 2008, the disclosure of which is incorporated herein by reference. The PCT International Application was published in the German language.

FIELD OF THE INVENTION

The invention relates to a method for generating a compensated train of temporally equidistant short laser pulses, the frequency comb of which comprises individual lines whose carrier envelope offset frequency is stabilized at a predetermined value, as well as to a device for generating a train of such short laser pulses. "Stabilizing" here means the setting of a magnitude to a constant value. The stabilizing to a predetermined value thus constitutes the setting of a magnitude such that this magnitude has the predetermined value constant over time.

BACKGROUND OF THE INVENTION

A train of short laser pulses may be generated with a so-called mode-coupled laser. In a laser medium, it is possible to incite very many self-oscillations with various frequencies with sufficient bandwidth of a laser transition in the resonator of the laser. The self-oscillations are also referred to as modes. By means of suitable mechanisms it is possible to produce a consistent phase relationship between the self-oscillations. This is called mode synchronization or mode coupling. Due to mode coupling, an emission of short light pluses with a time interval $\tau_R$ corresponding to a circulation period of a laser pulse in the resonator of the laser is effected. The direct result of the temporal equidistance of the pulses is that the frequency spectrum of such a laser consists of equidistant individual lines, a so-called frequency comb. Due to this relationship, a method, or a device, respectively, generating such a train of short laser pulses or a modified train of short laser pulses may also be referred to as a method, or device, respectively, for generating a frequency comb. The distance in the frequency space between the individual lines $\Delta f$ corresponds to an inverse value of the circulation period in the resonator $\tau_R$. Thus, there applies: $\Delta f = 1/\tau_R$.

From the article "Route to phase control of ultrashort light pulses" by L. Xu et al., Opt. Lett. 21, 2008 et seq. (1996) it is known that the frequencies $f_i$ of the individual lines i are no integer multiples of the difference frequency $\Delta f$. Rather, the following relation exists for the frequencies $f_i$ of the individual lines i: $f_i = f_{CEO} + i\Delta f$. Here, $f_{CEO}$ indicates an offset frequency referred to as carrier envelope offset (CEO) frequency in literature. This offset frequency is caused by the fact that the group velocity of the laser pulses deviates from the phase velocity of the individual superposed laser modes, or individual lines, respectively. Typically, the electrical field of the individual laser modes propagates with a slightly higher phase velocity through the electrical media in the resonator of the laser than the envelope of the laser pulse. This results in a phase offset $\Delta\phi_{CEO} = 2\pi f_{CEO}\tau_R$ between the envelope and the individual modes with every circulation in the resonator. With respect to time this offset means that a time offset occurs between the occurrence of a maximum amplitude of the electrical field and the occurrence of the maximum amplitude of the envelope. This time offset is frequently also referred to as carrier envelope offset phase $\Delta\phi_{CEO}$, although the time offset is correctly given by $\Delta T_{CEO} = \Delta\phi_{CEO}/2\pi v_0$, wherein $v_0$ is the carrier frequency of the laser pulse.

Since the magnitude of the carrier envelope offset frequency $f_{CEO}$ is severely dependent on environmental factors, e.g. the temperature and the air pressure, but also the pumping performance of the laser medium, etc. so as to list just a few, but not all factors, the carrier envelope offset frequency is moreover not stable with respect to time.

In prior art, various methods have been proposed for determining the carrier envelope offset frequency $f_{CEO}$. In the publication "Carrier-envelope offset phase control: A novel concept for absolute optical frequency measurement and ultrashort pulse generation" by H. R. Telle et al., Appl. Phys. B 69, 327 et seq. (1999), some possible methods are described. So-called f-to-2f interference methods in which part of the laser signal is conducted into an interferometer are most frequently used. In the interferometer a non-linear optical process is utilized to generate the second harmonic of a low-energy laser mode or of a low-energy individual line of the frequency comb, respectively, and to bring it to interference with a high-energy (high-frequency) individual line of the frequency comb of the laser pulse. If $f_i$ is the frequency from the low-energy region of the frequency comb $f_i = i\cdot\Delta f + f_{CEO}$, $2f_i = (2i\Delta f + 2f_{CEO})$ applies after the frequency doubling. Thus, if this frequency-doubled individual line is brought to interference with an individual line having the double frequency, i.e. $f_{2i} = 2i\Delta f + f_{CEO}$, then $2f_i - f_{2i} = (2i\Delta f + 2f_{CEO}) - (2i\Delta f + f_{CEO}) = f_{CEO}$ results for the beat signal. The frequency of the beat signal thus directly indicates the carrier envelope offset frequency.

For some applications it is sufficient to know the carrier envelope offset frequency. For other applications it is, however, desirable and/or necessary to keep the phase offset between the underlying electrical field and the envelope of the laser pulse constant, preferably to minimize it to zero.

This is, for instance, of advantage and/or necessary when generating short pulses with pulse lengths in the range of attoseconds.

DE 199 11 103 A1 discloses a method and a device for generating short laser pulses, as well as the use thereof for synthesizing optical frequencies. In a stabilized laser device in which laser pulses circulating in a resonator arrangement, and that are each composed of spectral components corresponding to a plurality of longitudinal modes of the resonator arrangement are generated every mode is, by a predetermined setting of the linear dispersion of the resonator arrangement, subject to a spectral-specific frequency change. There is described a control for the simultaneous setting of the dispersion and of the resonator length by means of which the group and phase circulation times of the light pulses circulating in the resonator are controlled. The setting of the dispersion may, for instance, be achieved by inserting wedge prisms into the beam path. Alternatively and/or additionally, the resonator may comprise a pivotable end mirror. The measures proposed for changing the dispersion necessarily result in a change of the optical path length and/or in a change of the resonator circulation period $\tau_R$, i.e. the time interval of the of the light pulses changes. In order to keep this interval and/or the frequency distance of the individual lines $\Delta f$ constant, a further control is required which controls, for instance, the resonator length. The methods and devices described in DE 199 11 103 A1 each require at least two control circuits influencing each other to keep the carrier envelope offset frequency $f_{CEO}$ and the resonator circulation period $\tau_R$ and/or the repetition frequency $f_{rep}$ corresponding to the frequency distance $\Delta f$ constant. The effort with respect to the apparatus is correspondingly high. Since mechanical movements of optical components are required in the resonator of the laser, the regular bandwidths that are achievable are generally restricted to few kHz. A far quicker control may be achieved pursuant to DE 199 11 103 A1 by a variation of the pumping performance of the laser oscillator by acousto-optical or electro-optical modulators. This, however, influences the peak power of the pulses circulating in the resonator, which in turn manipulates the phase offset $\Delta\phi_{CEO}$ by non-linear optical processes. While acousto-optical modulators are restricted to regular bandwidths of up to approximately 100 kHz, electro-optical systems may reach regular bandwidths in the MHz range. The systems are, however, limited due to the control electronics. Since a free oscillation build-up has to be avoided, the regular amplification is typically limited. This in turn results in that very quick interference components of the $\Delta\phi_{CEO}$ signal (so-called "glitches") can be compensated insufficiently only.

US 2007/0086713 A1 describes a frequency standard based on a mode-coupled fiber laser. The carrier envelope offset frequency is determined and used, via a phase lock loop circuit, for controlling laser parameters such as, for instance, the pumping power or the temperature of a Bragg grating so as to stabilize the carrier envelope offset frequency itself, i.e. to set it to a constant value.

Irrespective of the exact design, no laser systems are known in prior art in which, by a stabilization of the value of the carrier envelope offset frequency $f_{CEO}$, other laser parameters such as, for instance, the laser power, the pulse duration, or the pulse repetition rate that is identical with the circulation frequency are not influenced, too.

The technical problem underlying the invention is therefore to provide a method and a device generating a frequency comb in which the carrier envelope offset frequency is stabilized, preferably compensated.

SUMMARY OF THE INVENTION

In accordance with the invention, the technical object is solved by a method and/or a device with the features of the independent claims. Advantageous embodiments and further developments result from the subclaims.

The invention is based on the idea of determining the carrier envelope offset frequency by means of experiments and to shift the individual lines of the frequency comb of the train of temporally equidistant short laser pulses by a frequency that is derived from the carrier envelope offset frequency determined. To this end, an acousto-optical frequency shifter is used. In particular, a method for generating a compensated train of short laser pulses is thus proposed, wherein the method comprises the steps of: receiving an uncompensated train of temporally equidistant short laser pulses, preferably from a mode-coupled laser; determining a CEO signal whose frequency corresponds to a carrier envelope offset frequency of the individual line of the frequency comb of the received uncompensated train of short laser pulses; leading the uncompensated train of short pluses on an acousto-optical frequency shifter; and controlling the acousto-optical frequency shifter with a control signal derived from the CEO signal. In the first order of diffraction of the acousto-optical frequency shifter, a compensated train of temporally equidistant laser pulses emanates. Here, the individual lines of the pertinent frequency comb are stabilized with respect to the carrier envelope offset frequency, i.e. set (adjusted) to a value.

A corresponding device for generating a compensated train of short laser pulses whose frequency comb comprises equidistant individual lines whose carrier envelope offset frequency is or is being stabilized, i.e. is or is being set, to a preselected value, comprises a carrier envelope offset frequency determining unit for generating a CEO signal whose frequency corresponds to a carrier envelope offset frequency of individual lines of a frequency comb of the uncompensated train of short laser pluses. The carrier envelope offset frequency determining unit is coupled to a control unit deriving a control signal from the CEO signal. The device further comprises an acousto-optical frequency shifter that is arranged in the beam path of the uncompensated train of short pulses and that is adapted such that it is operated as a linear frequency shifter, wherein the acousto-optical frequency shifter is controlled by means of the control signal. This means that the control signal has a frequency that is used as an acoustic frequency in the acousto-optical frequency shifter so as to shift the frequencies of the individual lines linearly by exactly this frequency. An uncompensated train of short laser pulses means a light signal with temporally equidistant short light pulses whose frequency spectrum comprises individual lines whose frequency does not correspond to an integer multiple of the frequency distance of the individual lines. This means that the carrier envelope offset is not equal to zero. A compensated train of short laser pulses means a light signal with short temporally equidistant light signals whose frequency spectrum comprises individual lines whose carrier envelope offset frequency is stabilized, i.e. set, to a predetermined value, preferably to the value zero. An advantage of the invention over prior art consists in that no complex control electronics is required. In the method and/or device proposed, the response time is indeed limited by the transit time of the acoustic wave in the acousto-optical frequency shifter, but an oscillating behavior as with a control loop cannot occur. Furthermore, no controlling intervention in the laser oscillator is required, so that side effects such as an amplitude modulation or a disturbance of other laser parameters do not occur. A static modification of the pulse duration indeed takes place, but this is constant with respect to time and is easy to compensate.

For compensating the carrier envelope offset frequency, the device and the method proposed here do not require any reference frequency that is not contained in the original uncompensated train of short temporally equidistant laser pulses. The method is therefore referred to as self-referencing. A compensated train of short laser pulses generated with this method thus represents a self-referenced frequency comb. In analogy to this, a device adapted to perform the method is referred to as a device for generating a self-referenced frequency comb.

The advantage that no controlling interventions in the laser oscillator are necessary facilitates the operation of the device and the design of the laser. The device may be used with any mode-coupled laser.

For determining the CEO signal it is preferably provided to conduct part of the received uncompensated train of short laser pulses into an interferometer. Such an interferometer is preferably designed as an f-to-2f interferometer. The carrier envelope offset frequency determining unit thus comprises preferably an f-to-2f interferometer and a photosensitive detector receiving a beat signal from which the CEO signal is derived. Basically, any method and any device may be used to determine the CEO signal. Some examples are described in H. R. Telle et al., Appl. Phys. B 69, 327 et seq. (1999).

In a particularly preferred manner, the CEO signal is derived from the beat signal by means of frequency filtering. To this end, a high frequency filter is preferably provided which filters the beat signal. In a particularly preferred manner, the high frequency filter is designed as a band pass filter. The high frequency filter is coarsely adjusted to the expected carrier envelope offset frequency.

In order to generate the control signal, the CEO signal is amplified in one embodiment so as to directly drive the acousto-optical frequency shifter therewith.

The acousto-optical frequency shifter is in particular designed such that it shifts, in a first order of diffraction, all the individual lines of the frequency comb by a constant frequency amount $\Delta f_s$. The amount $\Delta f_s$ corresponds to the frequency with which acoustic oscillations are incited in the acousto-optical frequency shifter. A Bragg condition of the frequency shifter may be chosen such that the individual frequencies are increased by $\Delta f_s$ ($\Delta f_s > 0$) or alternatively decreased by $\Delta f_s$ ($\Delta f_s < 0$). If one makes use of a negative $\Delta f_s$, all the individual lines of the frequency comb are exactly compensated by $f_{CEO}$ if the frequency of the control signal concurs with the frequency of the CEO signal, so that the resulting individual lines of the frequency comb are integer multiples of the repetition frequency of the laser and/or of the inverse of the time interval of the individual light pulses and/or the resonator circulation time $\tau_R$ of the laser in which the train of short laser pulses is generated. It is noted that, apart for the CEO signal, a mirror frequency resulting from the difference of the repetition frequency or of a multiple thereof and the carrier envelope offset frequency $f_{CEO}$ also occurs in the beat signal. This mirror frequency $f_m$ may also be extracted and used as a CEO signal, wherein the acousto-optical frequency shifter will then have to be used with a Bragg condition that causes a positive $\Delta f_s$.

An improved noise suppression in the CEO signal and a more stable driving of the acousto-optical frequency shifter are achieved with an embodiment in which the CEO signal that is used is the signal of a high frequency oscillator that is coupled in a phase-locked manner to the CEO signal. Preferably, a voltage-controlled oscillator is used. In such an embodiment, the carrier envelope offset frequency determining unit comprises a preferably voltage-controlled high frequency oscillator whose output signal serves as CEO signal, wherein the high frequency oscillator is coupled in a phase-locked manner to the beat signal or the filtered beat signal via a coupling circuit. The coupling may, for instance, be performed via a phase detector with a low pass filter as well as a proportional integral controller driving the voltage-controlled oscillator. This embodiment results as a whole in higher amplitude stability of the optical signal diffracted at the phase shifter, which is the desired/useful signal that is generated. Furthermore, noise in the compensated train of short laser pulses (the desired signal) is suppressed.

An advantage of the described embodiments is that it is possible to compensate the carrier envelope offset frequency in the output signal to zero. In this respect, the CEO signal is "directly" used as a control signal, i.e. the control signal is generated with the frequency corresponding to that of the CEO signal. Likewise it is, however, also possible in a further embodiment to set a desired preselected carrier envelope offset frequency for the individual lines of the frequency comb. To this end, the control signal is generated by a frequency mixture of an offset frequency signal comprising an offset frequency with the CEO signal. The control unit is thus adapted to receive an offset frequency signal comprising an offset frequency, and comprises a mixing device to generate the control signal by a frequency mixture of the offset frequency signal with the CEO signal. In particular in the case of a high-precise frequency measurement it is thus possible to shift the individual lines of the frequency comb systematically, so that these individual lines in the compensated train of short laser pulses, for instance, have a carrier envelope offset frequency corresponding to the predetermined offset frequency.

The offset frequency may be generated in almost any manner. One embodiment provides the offset frequency to be derived from the repetition frequency of the laser. To this end, a further photosensitive detector is provided (in addition to the detector for detecting the beat signal which is provided in the carrier envelope offset frequency determining unit) to generate, from the (uncompensated or compensated) train of short laser pulses, an electronic repetition signal representing the repetition frequency signal of the short laser pulses, and a divider unit is provided to derive the offset frequency signal by dividing the electronic repetition signal. Other embodiments may provide that the offset frequency signal is derived electronically in some other manner from the electronically derived repetition signal.

In order to be able to use an optimal functioning of the device according to the invention with any mode-coupled laser, it is expedient to adapt, via dispersion adaptation means in the laser which is operated in an uncontrolled manner, the carrier envelope offset frequency coarsely to the mid-band frequency of the acousto-optical frequency shifter. Preferably, the CEO frequency is adapted such that it corresponds to the mid-band frequency of the acousto-optical frequency shifter. An adaptation of the carrier envelope offset frequency in the laser corresponds to an adaptation of the acousto-optical frequency shifter, i.e. a selection of the acousto-optical frequency shifter in such a manner that its mid-band frequency is adapted to the carrier envelope offset frequency of the mode-coupled laser. In order to achieve a sufficient distance of the carrier envelope offset frequency to the repetition frequency in the beat signal of an f-to-2f interferometer, the CEO frequency of the laser is preferably set to approximately $$\left(\left(\frac{2n+1}{4}\right) \cdot f_{rep}\right),$$

wherein $n = 0, 1, 2, \ldots$ and $f_{rep}$ is the repetition frequency of the laser pulses.

In the case of diffraction of the train of short laser pulses at the acousto-optical frequency shifter, a spatial wavelength-dependent spreading (angle dispersion) in the first diffraction order occurs due to the wavelength-dependent diffraction. Such a spatial spreading is referred to as spatial chirp here. In order to compensate this, one or several angle-dispersive elements are preferably arranged in the direct vicinity of the acousto-optical frequency shifter, which compensate the spatial chirp at least of the first diffraction order. The one or the several angle-dispersive elements may comprise prisms, gratings, or so-called grisms individually or in combination. For a compensation in the first diffraction order it is of advantage if the angle-dispersive element(s), for instance, a compensation prism, is/are arranged as direct as possible behind the frequency shifter. This, however, results in that the zeroth order has a wavelength-dependent spreading. If a particularly good spectral beam homogeneity in both diffraction orders is desired, it may be advantageous to introduce the angle-dispersive element(s), for instance, the compensation prism, into the beam path at a larger distance to the frequency shifter, so that only the compensated train of short laser pulses diffracted in the first order is compensated with respect to the spatial chirp.

In a particularly preferred embodiment of the invention, the individual components are designed fiber-optically. Thus, it is easy to use the device with a fiber laser. From prior art, fiber-coupled variants of frequency shifters are known. Likewise, an f-to-2f interferometer may also be designed fiber-optically. This provides a simple and compact structure for stabilizing the laser signal.

If the device according to the invention is to be used with a mode-coupled laser whose frequency comb does not comprise a complete octave of individual lines or modes, respectively, one embodiment provides that the f-to-2f interferometer comprises an additional optical element that results in a frequency widening of the frequency comb by means of a non-linear optical effect, wherein further higher-energy lines of the frequency comb are generated, for instance, by means of four wave mixture. A micro-structured photonic crystal fiber (PCF) may, for instance, be used as an optical element.

In order to compensate group delay dispersion effects occurring during the diffraction at the acousto-optical frequency shifter, i.e. to compensate a pulse duration modification, it is advantageous to provide that one or several sequences of prisms and/or gratings and/or chirped mirrors are arranged in the beam path of the uncompensated train of short laser pluses and/or the first diffraction order and/or the zeroth diffraction order of the acousto-optical frequency shifter such that the uncompensated train of short laser pulses and/or the first diffraction order and/or the zeroth diffraction order is/are impressed with a negative group delay dispersion adapted to the group delay dispersion of the acousto-optical frequency shifter, so as to compensate the group delay dispersion of the acousto-optical frequency shifter. The uncompensated train of short laser pulses and/or the first diffraction order and/or the zeroth diffraction order of the acousto-optical frequency shifter are guided via a sequence of prisms and/or gratings and/or chirped mirrors which impress a negative group delay dispersion adapted to the group delay dispersion of the acousto-optical frequency shifter, so as to compensate the group delay dispersion of the acousto-optical frequency shifter. A compensation of the uncompensated train of short laser pulses prior to a guiding on the acousto-optical frequency shifter has the advantage that both the first and the zeroth diffraction orders emanating from the acousto-optical frequency shifter are compensated with respect to the group delay dispersion.

SHORT DESCRIPTION OF THE DRAWINGS

Figure 2:
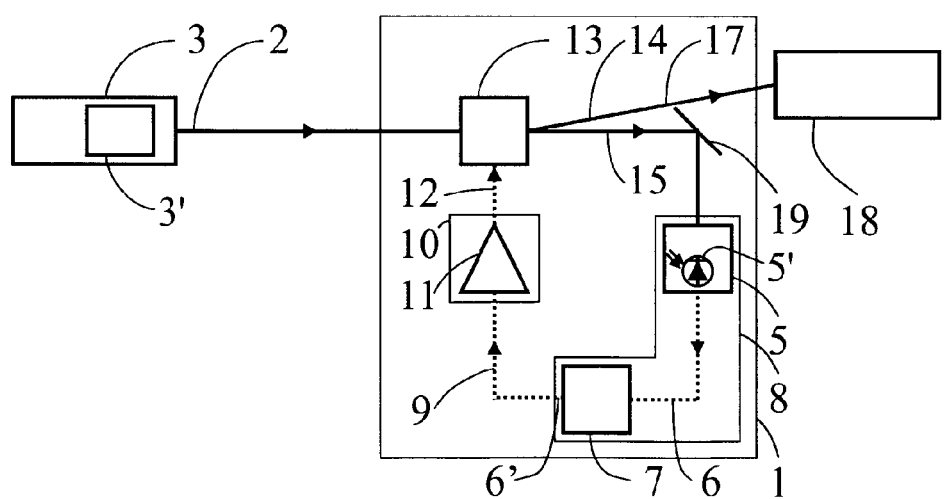
Figure 3A:
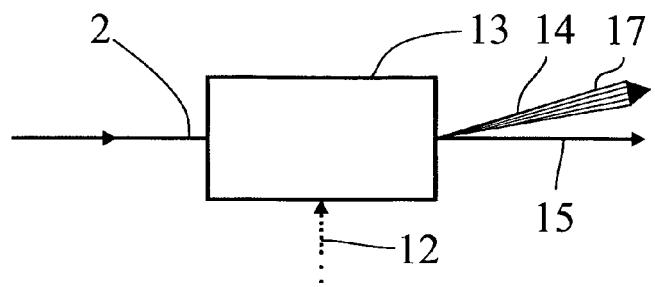
Figure 3B:
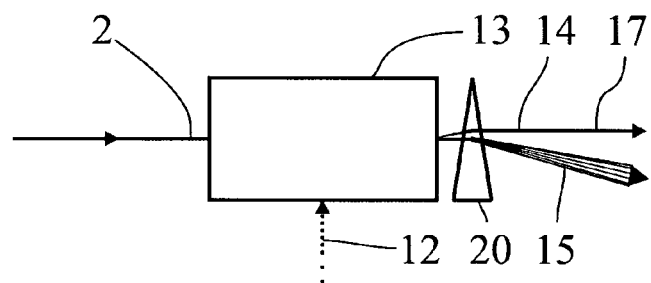
Figure 4:
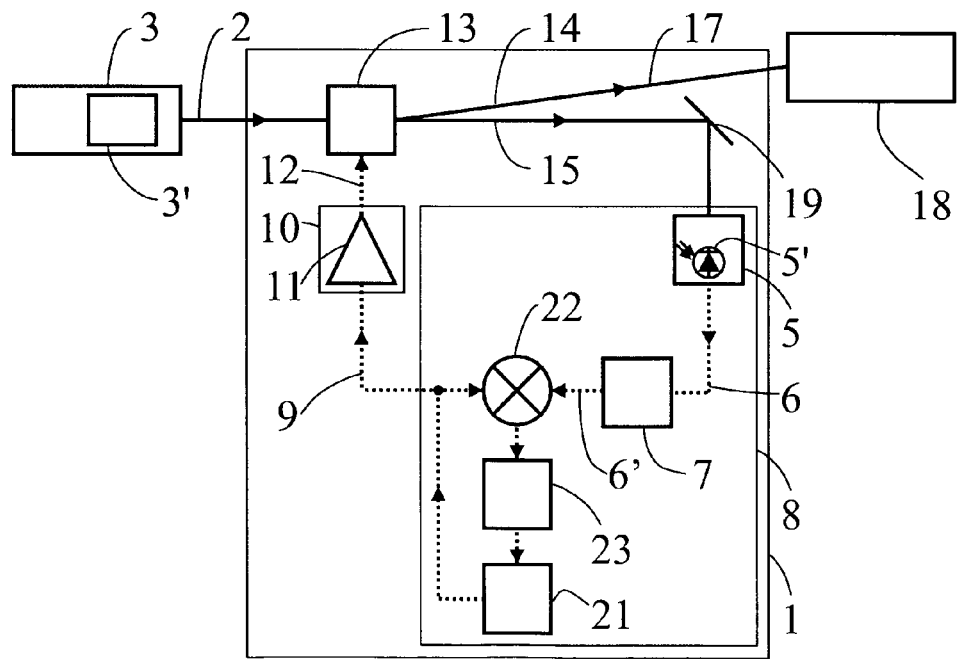
Figure 5:
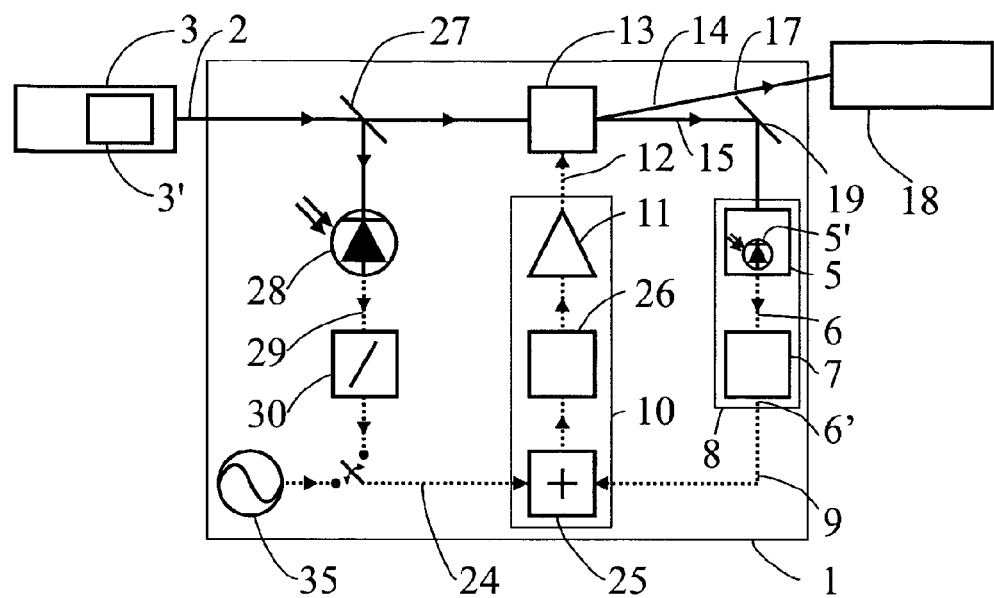
Figure 6:
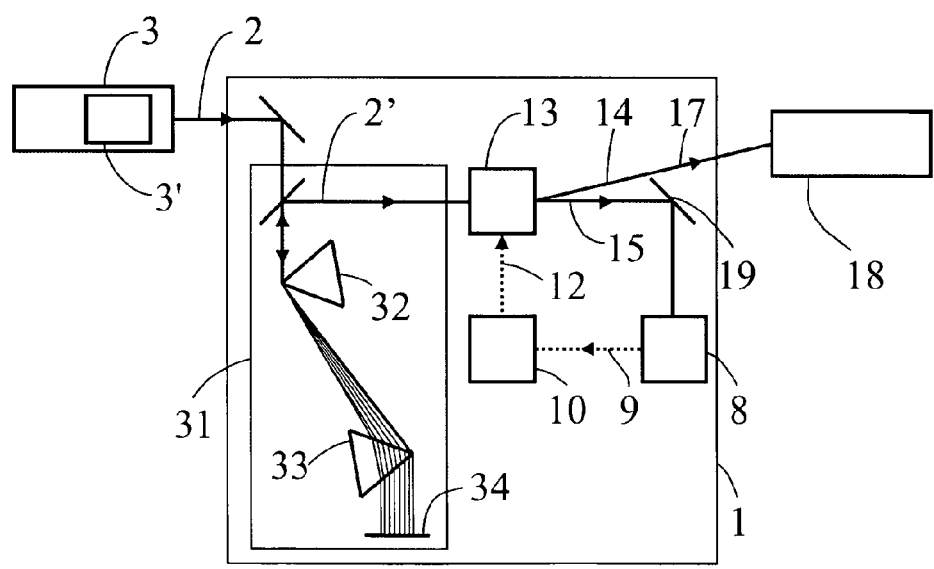

In the following, the invention will be explained in more detail with reference to the drawings. Therein show:

FIG. 1 a schematic illustration of a first, simplified embodiment of the invention;

FIG. 2 a schematic illustration of a second, simplified embodiment of the invention;

FIG. 3a, 3b schematic illustrations for explaining the compensation of a spatial chirp;

FIG. 4 a further schematic illustration of an embodiment of the invention in which an improved noise suppression is achieved in the output signal;

FIG. 5 a schematic illustration of an embodiment of a device according to the invention in which the carrier envelope offset frequency of the individual lines of the frequency comb of the compensated train of short laser pulses may be preselected variably; and FIG. 6 a schematic illustration of an embodiment in which dispersive group delay effects are pre-compensated.

DESCRIPTION OF THE PREFERRED EMBODIMENTS OF THE INVENTION

FIG. 1 schematically illustrates a device for generating a self-referenced frequency comb, or for generating a compensated train 17 of temporally equidistant short laser pulses, respectively, in which the individual lines of the frequency comb comprise a stabilized carrier envelope offset frequency. Such a device will be referred to as a device for generating a self-referenced frequency comb in the following. The device 1 is adapted to receive an uncompensated train 2 of temporally equidistant short laser pulses of a mode-coupled laser 3. The mode-coupled laser may, for instance, be a titanium:sapphire laser or an erbium fiber laser. The uncompensated train 2 of short laser pulses constitutes, when viewed in the frequency space, a frequency comb of equidistant individual lines that are also referred to as modes. The individual lines of the frequency comb have a frequency distance $\Delta f$ corresponding to the inverse of the circulation period of one of the short pulses in the resonator of the mode-coupled laser 3. The frequencies $f_i$ of the individual lines are, however, no integer multiples of the frequency distance $\Delta f$ corresponding to the repetition frequency $f_{rep}$ of the short laser pulses ($f_{rep}=\Delta f$). Rather, all individual lines comprise an additional frequency offset. This offset frequency is referred to as carrier envelope offset (CEO) frequency $f_{CEO}$. This carrier envelope offset frequency $f_{CEO}$ is, in a mode-coupled laser in which it is not stabilized by means of special control mechanisms, not constant with respect to time. This means that the carrier envelope offset frequency fluctuates with respect to time. Various environmental influences such as, for instance, temperature, variation in the pumping performance, air pressure, etc. in the mode-coupled laser 3 are responsible for this. It is an object of the device 1 for generating a self-referenced frequency comb to stabilize (i.e. to set stably) the frequency offset due to the carrier envelope offset frequency, and to compensate it preferably to zero or another predetermined value. To this end, in the embodiment illustrated in FIG. 1, part of the light of the uncompensated train 2 of short laser pulses is coupled out to an f-to-2f interferometer 5 at a beam divider mirror 4.

If the frequency comb of the uncompensated train 2 of short laser pulses does not span an octave, a frequency widening of the frequency comb is performed. To this end, for instance, a micro-structured photonic crystal fiber may be used. By means of four wave mixture, higher- and low-energy lines may thus be generated in the frequency comb, for the frequencies $f_i$ of which there also applies: $f_i=i \cdot \Delta f + f_{CEO}$. This way, if necessary, a frequency comb is generated which spans at least one octave. For determining the carrier envelope offset frequency, a low-energy individual line is frequency-doubled in an optical element, by means of a non-linear optical effect, and brought to interference with a high-energy (non-frequency-doubled) individual line of the frequency comb on a photosensitive detector 5'. The high-energy individual line of the frequency comb has approximately double the frequency of the low-energy individual line that is frequency-doubled. A beat signal 6 whose frequency corresponds to the carrier envelope offset frequency is detected on the photosensitive detector 5' that may, for instance, be a photo diode or a photomultiplier (secondary electron multiplier). Likewise, a beat signal of a mirror frequency $f_m$ may be measured which corresponds to the difference sum frequency of the laser $f_{rep}$ and the carrier envelope offset frequency $f_{CEO}$, i.e. $f_m = n \cdot f_{rep} \pm f_{CEO}$, wherein n=1, 2, . . . . Since the carrier envelope offset frequency lies in the radio frequency range, it may be measured directly with the photosensitive detector 5'. The beat signal 6 obtained this way is supplied to a high frequency filter 7 that is preferably designed as a simple band pass filter. By this, the carrier envelope offset frequency is selected or derived, respectively, from the beat signal. The f-to-2f interferometer 5 and the high frequency filter 7 jointly form a carrier envelope offset frequency determining unit 8. This unit provides a so-called CEO signal 9 as an electronic output signal.

In all the drawings electronic signals are illustrated by means of dotted lines and light signals are illustrated by means of continuous lines.

The CEO signal 9 is supplied to a control unit 10. In the illustrated embodiment, this control unit comprises an amplifier 11 to generate a control signal 12 for an acousto-optical frequency shifter 13. The control signal 12 is a high frequency signal having the carrier envelope offset frequency $f_{CEO}$ (alternatively the mirror frequency $f_m$). The portion of the uncompensated train 2 of short laser pulses which passes the beam divider mirror 4 is supplied to the acousto-optical frequency shifter 13. The latter is operated such that light emanating in a first diffraction order 14 is shifted by a frequency amount $-\Delta f_s$. This means that the frequencies of the individual lines of the frequency comb of the train 2 of short laser pulses are each decremented by the frequency with which the acousto-optical frequency shifter 13 is driven. Since the control signal 12 has the carrier envelope offset frequency $f_{CEO}$, all individual lines are decremented by exactly this carrier envelope offset frequency. Thus, the individual lines are each compensated exactly by the carrier envelope offset frequency $f_{CEO}$, so that the individual lines now have a frequency that is an integer multiple of the repetition frequency $f_{rep}$. For the individual lines of the frequency comb of a compensated train 17 of short laser pulses there applies thus: $f_i = i\, f_{rep}$, wherein i is a natural number. The zeroth order 15 of the train 2 of short laser pulses is led on a beam stopper 16.

The compensated train 17 of short laser pulses emanating in the first diffraction order 14 from the device 1 for generating a self-referenced frequency comb is thus compensated with respect to the carrier envelope offset frequency. This means that a constant phase relationship is given for all laser pulses between the envelope and the underlying electrical field. The correspondingly compensated train 17 of short laser pulses may be supplied to an application 18. This may be any application, for instance, an optical amplifier. The application may also be a spectroscopy arrangement to perform absolute frequency measurement. A plurality of further applications are conceivable, for instance, the generation of short laser pulses.

FIG. 2 schematically illustrates a further embodiment of a device 1 for generating a self-referenced frequency comb. In all figures, identical technical features are provided with identical reference numbers.

The embodiment according to FIG. 2 differs from that according to FIG. 1 in that the portion of the uncompensated train 2 of short laser pulses used for determining the carrier envelope offset frequency $f_{CEO}$ is not coupled out prior to striking the acousto-optical frequency shifter 13. Rather, the zeroth diffraction order 15 is directed via a mirror 19 to the f-to-2f interferometer 5 of the CEO determining unit 8. Apart from that, the embodiment equals to that of FIG. 1. An advantage of this embodiment is that the power available is utilized more efficiently in the uncompensated train 2 of short laser pulses.

In the schematic illustration according to FIG. 1 and FIG. 2 there has not yet been taken into account that the diffraction at the acousto-optical frequency shifter 13 is performed as a function of the wavelengths. This means that the different frequency portions of the compensated train 17 of short laser pulses in the first diffraction order 14 emanate from the acousto-optical frequency shifter 13 in slightly different directions. This is illustrated schematically in FIG. 3a. In order to compensate this spatial spreading that is also referred to as spatial chirp, an angle-dispersive element that is designed as a compensation prism 20 in the instant case is inserted behind the acousto-optical frequency shifter 13 in FIG. 3b. The compensation prism 20 is preferably positioned directly behind the acousto-optical frequency shifter 13 so as to achieve a preferably good compensation in the compensated train 17 of short laser pulses. By this, however, the zeroth order 15 is influenced such that it is now split spatially with respect to the different frequencies. If a beam homogeneity is aimed for both in the zeroth diffraction order 15 and in the first diffraction order 14, the compensation prism 20 may also be positioned at a larger distance to the acousto-optical frequency shifter 13, so that the zeroth order does not pass through the compensation prism any longer.

An angle-dispersive compensation equal or similar to that of FIG. 3b exists preferably in all embodiments that are illustrated in FIGS. 1, 2 and 4 to 6, but is not shown there merely for reasons of simplification. It is a matter of fact that other angle-dispersive elements such as gratings or grisms may also be used for compensation individually or in combination (also with prisms).

FIG. 4 illustrates a further embodiment of a device 1 for generating a self-referenced frequency comb. It differs from the embodiment according to FIG. 2 in that the CEO signal is generated by means of an oscillator that is coupled in a phase-locked manner to the beat signal 6 or the filtered beat signal 6', respectively. The carrier envelope offset frequency determining unit 8 comprises to this end a phase detector 22 as well as a proportional integral controller 23 that couples the oscillator 21 that is designed as a voltage-controlled oscillator in a phase-locked manner to the beat signal 6 or the filtered beat signal 6', respectively. Thus, the amplitude of the CEO signal 9 is stabilized via a phase lock loop circuit. By this, a more stable design of the acousto-optical frequency shifter 13 and hence a reduction of noise in the compensated train 17 of short laser pulses is achieved.

With respect to the embodiment according to FIG. 4 it is noted that the carrier envelope offset frequency determining unit 8 may, of course, be designed like the corresponding carrier envelope offset frequency determining unit 8 of FIG. 2.

FIG. 5 is an embodiment of a device 1 for generating a compensated train 17 of short laser pulses in which a carrier envelope offset frequency of the individual lines in the frequency comb of the compensated train 17 of short laser pulses may be preselected consistently. Deviating from the embodiments according to FIG. 3 or FIG. 4, the control unit 10 is designed to receive, in addition to the CEO signal 9, an offset frequency signal 24 and to perform a frequency mixture between the offset frequency signal 24 and the CEO signal 9 in a frequency mixing unit 25. The frequency mixing unit 25 is, for instance, designed as a frequency adder. The frequency mixing unit 25 may, however, also be any other unit for mixing frequencies of electronic signals. The output signal of the frequency mixing unit 25 is conducted over a further high frequency filter 26 that is designed as a band pass, and is subsequently amplified in the amplifier 11 so as to generate the control signal 12.

The offset frequency signal 24 may either be generated in an oscillator 35 that may also be designed as a frequency synthesizer. Alternatively, the offset frequency signal 24 may be derived from the repetition frequency of the train 2 of uncompensated short laser pulses. (Alternatively, a derivation from the compensated train 17 of short laser pulses is also possible). To this end, a beam divider mirror 27 is provided in the beam path which couples out part of the light of the train 2 of short laser pulses and directs it to a further photosensitive detector 28. This further photosensitive detector 28 is indeed not capable of resolving the oscillations of the electrical field ranging in the tera-hertz region, but it is possible with the further photosensitive detector 28 to detect the repetition frequency $f_{rep}$ of the mode-coupled laser, i.e. the individual pulses of the train 2 of short laser pulses. A repetition signal 29 representing the repetition frequency may be converted to the offset frequency signal 24 via a divider unit 30. The divider unit 30 may perform any rational division of the repetition frequency in a frequency-stabilized manner with respect to the repetition frequency $f_{rep}$.

During a diffraction of the train 2 of short laser pulses at the acousto-optical frequency shifter 13, dispersive group delay effects may occur, in particular if the individual laser pulses in the train 2 of short laser pulses have a pulse width<100 fs. In order to pre-compensate those, a compensation unit 31 is illustrated schematically in FIG. 6. In so doing, the uncompensated train 2 of short laser pulses is first of all coupled out from the beam path and conducted over an arrangement of prisms 32, 33 and reflected back by the prisms 33, 32 at a reflector 34. In the compensation unit 31 that is illustrated in a simplified manner, two prisms 32, 33 are shown which are representative of a sequence of prisms. Alternatively, a sequence of gratings and/or chirped mirrors, or a combination of prisms and/or gratings and/or chirped mirrors may be used. These are arranged such that a negative group delay dispersion is impressed upon the train 2 of short laser pulses. The train 2' of short laser pulses emanating from the compensation unit 31 is thus pre-compensated with respect to the group delay dispersion prior to impining on the acousto-optical frequency shifter 13, so that the positive group delay dispersion occurring in the acousto-optical frequency shifter 13 results in that the compensated train 17 of short laser pulses emanating in the first diffraction order 14, which is compensated with respect to the carrier envelope offset frequency, is not influenced negatively with respect to a group delay dispersion by the device 1 for generating a self-referenced frequency comb. This means that no temporal stretching of the pulses takes place. For the person skilled in the art there results that, in this embodiment, the zeroth order is also compensated with respect to the group delay dispersion.

In other embodiments, the compensation with respect to the group delay dispersion may also be performed after the emanation from the acousto-optical frequency shifter in the first and/or zeroth diffraction orders. Such compensation units are constructed in analogy to that of FIG. 6.

It is a matter of fact that the compensation unit 31 or one or several analog compensation units that are arranged behind the acousto-optical frequency shifter may be added to any of the embodiments illustrated in FIGS. 1, 2, 4, and 5. The compensation unit 31 has not been illustrated in the other embodiments merely for reasons of simplification and clearness. The same applies to the compensation with respect to the spatial chirp which is described in relation with FIGS. 3a and 3b.

The illustrated embodiments are illustrated schematically only. Preferred embodiments are designed fiber-optically. This means that the individual components are largely designed fiber-optically and may be spliced into a fiber-optical structure. This relates to the individual illustrated units such as the carrier envelope offset frequency determining unit 8, the acousto-optical frequency shifter 13, the unit for deriving the offset frequency to the extent that it results from the repetition frequency of the train 2 of short laser pulses, or the compensation unit 31 for compensating the group delay dispersion in the acousto-optical frequency shifter.

In the Figures, the device 1 for generating a self-referenced frequency comb has been described as a self-contained device designed separately from a mode-coupled laser 3. A person skilled in the art understands that the mode-coupled laser 3, in particular in the case of a fiber-optical construction, may be integrated in the device. In particular in such embodiments the laser 3 is preferably designed such that the carrier envelope offset frequency is or may be adapted, via one or several dispersive elements that is/are here referred to as dispersion adaptation means 3' for reasons of simplification, in the resonator of the respective mode-coupled laser coarsely to a midband frequency of the acousto-optical frequency shifter 13 that performs the compensation with respect to the carrier envelope offset frequency. The dispersion adaptation means 3' may, for instance, comprise prisms, in particular wedge prisms. Alternatively, the acousto-optical frequency shifter 13 may be selected to be correspondingly adapted to the carrier envelope offset frequency of the laser 3. Since, however, the carrier envelope offset frequency depends on a plurality of environmental influences that influence optical elements in the resonator of the mode-coupled laser, it optical elements in the resonator of the mode-coupled laser, it is to be preferred to perform a coarse adaptation of the carrier envelope offset frequency in the respective mode-coupled laser. This adaptation is, however, not performed in a controlled manner or via a continuous control, but is necessary only once or in the case of stronger changes of the environmental conditions at larger time intervals.

The carrier envelope offset frequency is preferably selected such that it corresponds to $$\frac{(2n+1)}{4} \cdot f_{rep}$$

. This ensures that the carrier envelope offset frequency as a beat signal may be reliably differentiated from the also occurring mirror frequency and from other frequencies occurring in the beat signal or may be identified, respectively, and be isolated by a simple high frequency filter.

A particular advantage of the invention consists in that no controls are necessary which influence mechanical components of the resonator or the pumping performance of the laser-active medium. Rather, the compensation with respect to the carrier envelope offset frequency $f_{CEO}$ is performed completely separately (with the exception of the coarse adaptation of the carrier envelope offset frequency to the frequency of the acousto-optical frequency shifter, as mentioned above), irrespective of the operation of the mode-coupled laser. This enables a simpler, more cost-efficient construction of the entire device which provides a self-referenced frequency comb. A particular advantage further consists in that the carrier envelope offset frequency may be compensated to zero, which is necessary or at least advantageous for many applications.

It is to be understood that some specific details of the optical structure have not been mentioned, which the person skilled in the art is, however, generally familiar with. These may comprise mirrors, half-wave plates, polarization filters, etc., so as to enable an optimum beam control in the individual units of the device.

What is claimed is:

1. A method for generating a compensated train of short temporally equidistant laser pulses, the frequency comb of which comprises equidistant individual lines whose carrier envelope offset frequency ($f_{CEO}$) is adjusted to a predetermined value, comprising the steps of:
   receiving an uncompensated train of short temporally equidistant laser pulses;
   determining a CEO signal having a frequency corresponding to the carrier envelope offset frequency ($f_{CEO}$) of individual lines in the frequency comb of the uncompensated train of short equidistant laser pulses;
   controlling an acousto-optical frequency shifter with a control signal derived from the CEO signal; and
   leading the uncompensated train of short pulses on the acousto-optical frequency shifter, so that in a first diffraction order the compensated train of temporally equidistant short laser pulses is generated in which the individual lines of the pertinent frequency comb are shifted by the frequency ($f_s$) of the control signal.

2. The method according to claim 1, wherein the amplified CEO signal is used as control signal.

3. The method according to claim 1, wherein, for determining the CEO signal, part of the uncompensated train of short light pulses is conducted into an f-to-2f interferometer.

4. The method according to claim 1, wherein the CEO signal is derived from a beat signal of the f-to-2f interferometer.

5. The method according to claim 4, wherein the deriving of the CEO signal comprises frequency filtering of the beat signal.

6. The method according to claim 4, wherein a signal of an oscillator, in particular a voltage-controlled oscillator, that is coupled in a phase-locked manner to the beat signal or the filtered beat signal is used as the CEO signal.

7. The method according to claim 1, wherein the control signal is generated by a frequency mixture of an offset frequency signal comprising an offset frequency with the CEO signal.

8. The method according to claim 7, wherein the offset frequency signal is derived from an electronically converted signal of the train of short laser pulses, in particular in that a repetition signal generated at a photosensitive detector is subject to an electronic frequency division.

9. The method according to claim 1, wherein the uncompensated train of short laser pulses and/or the first diffraction order and/or the zeroth diffraction order of the acousto-optical frequency shifter is/are led over a sequence of prisms and/or gratings and/or chirped mirrors which impress a negative group delay dispersion adapted to the group delay dispersion of the acousto-optical frequency shifter so as to compensate the group delay dispersion of the acousto-optical frequency shifter.

10. The method according to claim 1, wherein at least the compensated train of short pulses which emanates in the first diffraction order from the acousto-optical frequency shifter is led over one or several angle-dispersive elements, e.g. a prism, so as to compensate a spatial chirp due to the wavelength-dependent diffraction in the acousto-optical frequency shifter.

11. The method according to claim 1, wherein a coarse adaptation of the mid-band frequency of the acousto-optical frequency shifter and of the CEO frequency ($f_{CEO}$) of the individual lines of the frequency comb of the uncompensated train of temporally equidistant short laser pulses is performed, in particular by a dispersion adaptation in a resonator of a laser generating the uncompensated train of temporally equidistant short laser pulses.

12. The method according to claim 1, wherein the CEO frequency ($f_{CEO}$) of the laser is adjusted to approximately $((2n+1)/4) \cdot f_{rep}$, wherein n=0, 1, 2, . . . and $f_{rep}$ is a repetition frequency of the laser pulses.

13. The method according to claim 1, wherein the carrier envelope offset frequency is adjusted to the value zero.

14. A device for generating a compensated train of temporally equidistant short laser pulses, the frequency comb of which comprises equidistant individual lines whose carrier envelope offset frequency is adjusted to a predetermined value, from an uncompensated train of short temporally equidistant laser pulses, comprising:
   a carrier envelope offset frequency determining unit for generating an electronic CEO signal having a frequency corresponding to the carrier envelope offset frequency ($f_{CEO}$) of individual lines in the frequency comb of the uncompensated train of short laser pulses;
   a control unit coupled to the carrier envelope offset frequency determining unit and deriving a control signal from the CEO signal; and
   an acousto-optical frequency shifter arranged in the beam path of the uncompensated train of short laser pulses and controlled by the control signal and arranged such that it is operated as a linear frequency shifter, so that in a first diffraction order the compensated train of temporally equidistant short laser pulses emanates in which the individual lines of the pertinent frequency comb are shifted by the frequency ($f_s$) of the control signal.

15. The device according to claim 14, wherein the control unit comprises an amplifier whose output signal serves as control signal.

16. The device according to claim 14, wherein the carrier envelope offset frequency determining unit comprises an f-to-2f interferometer and a photosensitive detector receiving a beat signal from which the CEO signal is derived.

17. The device according to claim 16, wherein the carrier envelope offset frequency determining unit comprises a high frequency filter to filter the beat signal and to generate a filtered beat signal from which the CEO signal is derived.

18. The device according to claim 16, wherein the carrier envelope offset frequency determining unit comprises an oscillator, in particular a voltage-controlled oscillator, whose output signal serves as CEO signal, wherein the oscillator is, via a coupling circuit, coupled in a phase-locked manner to the beat signal or the filtered beat signal.

19. The device according to claim 14, wherein the control unit is designed to receive an offset frequency signal and comprises a frequency mixing unit to generate the control signal by a frequency mixture of the offset frequency signal with the CEO signal.

20. The device according to claim 19, wherein a further photosensitive detector is provided to generate, from the train of short laser pulses, an electronic repetition signal representing the repetition frequency ($f_{rep}$) of the short laser pulses, and a divider unit to derive the offset frequency signal by a division of the electronic repetition signal.

21. The device according to claim 14, wherein one or several sequences of prisms and/or gratings and/or chirped mirrors are arranged in the beam path of the uncompensated train of short laser pulses and/or the first diffraction order and/or the zeroth diffraction order of the acousto-optical frequency shifter such that a negative group delay dispersion adapted to the group delay dispersion of the acousto-optical frequency shifter is impressed upon the uncompensated train of short laser pulses and/or the first diffraction order and/or the zeroth diffraction order so as to compensate the group delay dispersion of the acousto-optical frequency shifter.

22. The device according to claim 14, wherein at least one angle-dispersive element, e.g. a compensation prism, is arranged relative to the acousto-optical frequency shifter, so that at least the compensated train of temporally equidistant short laser pulses emanating in the first diffraction order is led through the angle-dispersive element so as to compensate a spatial chirp due to the wavelength-dependent diffraction in the acousto-optical frequency shifter.

23. The device according to claim 14, wherein a mode-coupled laser generating the uncompensated train of temporally equidistant short laser pulses, wherein the laser comprises at least one dispersion adaptation device so as to adapt the CEO frequency ($f_{CEO}$) of the individual lines of the frequency comb of the uncompensated train of temporally equidistant short laser pulses in an uncontrolled manner coarsely to a mid-band frequency of the acousto-optical frequency shifter.

24. The device according to claim 14, wherein the CEO frequency ($f_{CEO}$) of the individual lines of the frequency comb of the uncompensated train of temporally equidistant short laser pulses deviates from the mid-band frequency by less than 50% of the bandwidth of the acousto-optical frequency shifter within which a frequency shift by the mid-band frequency of the acousto-optical frequency shifter can be performed.

25. The device according to claim 14, wherein the control signal is derivable such that the carrier envelope offset frequency of the equidistant individual lines of the frequency comb of the compensated train of temporally equidistant short laser pulses is set to the value zero.

* * * * *

UNITED STATES PATENT AND TRADEMARK OFFICE
CERTIFICATE OF CORRECTION

| | | |
|---|---|---|
| PATENT NO. | : 8,416,819 B2 | Page 1 of 1 |
| APPLICATION NO. | : 13/132111 | |
| DATED | : April 9, 2013 | |
| INVENTOR(S) | : Grebing et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 72 days.

Signed and Sealed this
Third Day of December, 2013

Margaret A. Focarino
*Commissioner for Patents of the United States Patent and Trademark Office*